United States Patent [19]

Anglehart

[11] Patent Number: 5,125,541

[45] Date of Patent: Jun. 30, 1992

[54] VISCOUS LIQUID DISPENSING APPARATUS

[75] Inventor: James Anglehart, Montreal, Canada

[73] Assignee: Dwight Angelhart, Vancouver, Canada

[21] Appl. No.: 544,872

[22] Filed: Jun. 28, 1990

[51] Int. Cl.⁵ .............................................. B67D 5/00
[52] U.S. Cl. .................................... 222/158; 222/207
[58] Field of Search ............. 222/456, 158, 207, 215

[56] References Cited

U.S. PATENT DOCUMENTS

| | | | |
|---|---|---|---|
| 3,157,319 | 11/1964 | Schwienbacher | 222/207 |
| 3,175,736 | 3/1965 | Pelto | 222/207 |
| 4,077,547 | 3/1978 | Donoghue | 222/207 |
| 4,168,020 | 9/1979 | Benson | 222/207 |
| 4,324,349 | 4/1982 | Kaufman | 222/207 |
| 4,640,441 | 2/1987 | Bunschoten | 222/207 |
| 4,645,097 | 2/1987 | Kaufman | 222/207 |
| 4,899,789 | 2/1990 | Carow | 222/207 |

FOREIGN PATENT DOCUMENTS 2038779 7/1980 United Kingdom ................ 222/207

Primary Examiner—Michael S. Huppert
Assistant Examiner—Anthoula Pomrening

[57] ABSTRACT

There is disclosed an apparatus for dispensing a viscous liquid, the apparatus to be connected with a reservoir for holding the liquid (at least a part of the reservoir being resiliently squeezable), the apparatus comprising a measuring channel for measuring therein a quantity of the liquid to be dispensed, a spout in communication with an upper part of the channel, and an air trap including an air chamber, the air trap being in communication with a lower end of the channel and with substantially the bottom of the reservoir. The air trap is able in use to release an air bubble from the chamber into the lower end and to replenish the chamber with air. In this way, the quantity of liquid may be dispensed by squeezing the part of the reservoir to substantially fill the channel, causing the air trap to release the bubble, further squeezing to commence a flow of the liquid in the channel entraining the bubble until the bubble is released at the spout, releasing the apparatus so that the chamber is replenished by air filling the channel and the air trap as the air enters the reservoir.

8 Claims, 2 Drawing Sheets

VISCOUS LIQUID DISPENSING APPARATUS

BACKGROUND OF THE INVENTION

The present invention relates to a viscous liquid dispensing apparatus which permits a measuring of the liquid to be dispensed.

It is known that viscous liquids are often difficult and messy to measure for dispensation, since the liquid is difficult to pour into a measuring cup and slow to remove from the measuring cup. It is therefore desirable to have an apparatus which is able to dispense a measured quantity, so that the use of a measuring cup or the like is avoided.

Some of the viscous liquids which are advantageously dispensed from an apparatus capable of measuring are: liquid detergent, shampoo, oil, syrup and honey.

SUMMARY OF THE INVENTION

An object of the invention is to provide a viscous liquid dispensing apparatus which can be used to measure and dispense a quantity of viscous liquid.

Another object of the invention is to provide a viscous liquid dispensing apparatus which can be used to measure a variable quantity of viscous liquid.

According to the invention there is provided an apparatus for dispensing a viscous liquid, the apparatus to be connected with a reservoir for holding the liquid (at least a part of the reservoir being resiliently squeezable), the apparatus comprising a measuring channel for measuring therein a quantity of the liquid to be dispensed, a spout in communication with an upper part of the channel, and air trap means including an air chamber, the air trap means being in communication with a lower end of the channel and, in use, with substantially a bottom of the reservoir. The air trap means are able in use to release an air bubble from the chamber into the lower end and to replenished the chamber with air. In this way, the quantity of liquid may be dispensed by squeezing the part of the reservoir to substantially fill the channel, causing the air trap means to release the bubble, further squeezing to commence a flow of the liquid in the channel entraining the bubble until the bubble is released at the spout, releasing the reservoir so that the chamber is replenished by air filling the channel and filling the column and the air trap means as the level drops under negative pressure in the reservoir.

BRIEF DESCRIPTION OF THE DRAWINGS

The invention will now be better understood by way of the following description of a preferred embodiment with reference to the drawings wherein.

DETAILED DESCRIPTION OF THE PREFERRED EMBODIMENT

In the preferred embodiment, the apparatus 1 is used as a honey dispenser for dispensing a desired quantity of honey into a beverage such as tea or coffee.

Figure 1:
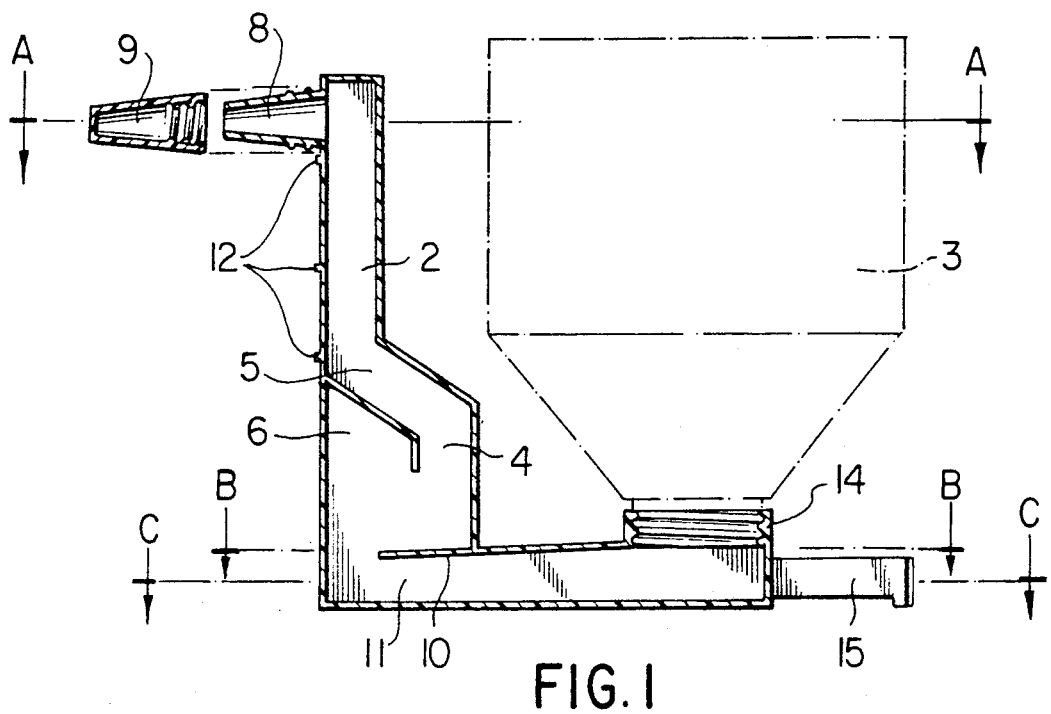
FIG. 1 is a side cross-sectional view of an apparatus according to the preferred embodiment.

As shown in FIG. 1, the apparatus 1 is connected with a round squeeze bottle reservoir 3 via screw connection 14 located in base 11, and has a channel 2 extending vertically, a spout 8 in communication with a top part of channel 2, a bottom inlet 4 of channel 2, and an air chamber 6. Channel 2 is provided with graduation marks or lines 12 to serve as indicating means for measuring a level of a bubble therein.

Channel 2 is shown in FIG. 1 as having at its lower end a deviation 5 toward the center of reservoir 3 giving rise to chamber 6. Chamber 6, inlet 4, shelf 10 and base passage 11 form air trap means in communication with channel 2 at the top and reservoir 3 at the bottom. As shown, shelf 10 and top of base passage 11 are sloped toward connection 14 to allow for a bubble to rise into reservoir 3. Two tabs 15 extend from base 11 to stabilize apparatus 1 when supporting reservoir 3.

Figure 2:
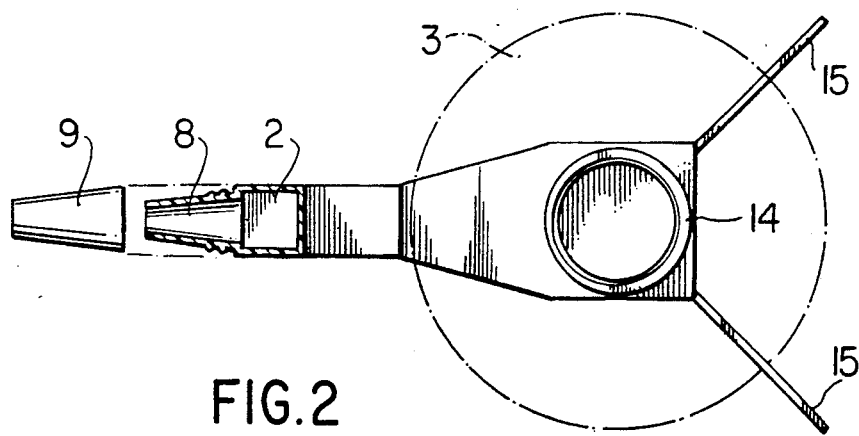
FIG. 2 is a horizontal cross-section of the apparatus of FIG. 1 about line A.

FIG. 2 shows the horizontal cross-section of the essentially round reservoir 3, the essentially square shaped horizontal cross section of channel 2, spout 8 and cap 9.

Figure 3:
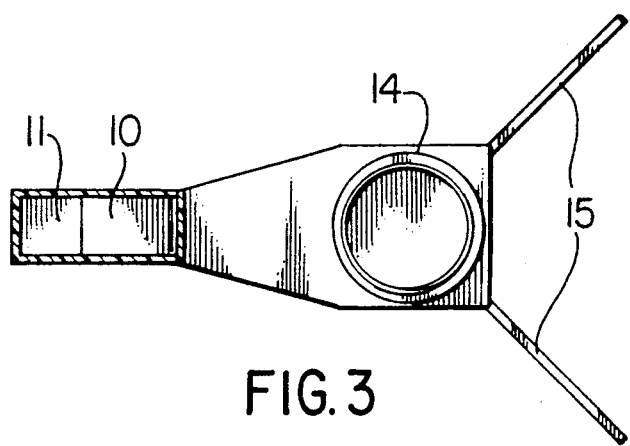
FIG. 3 is a horizontal cross-section of the apparatus of FIG. 1 about line B.

FIG. 3 shows the horizontal cross-section of apparatus 1 along the line of shelf 10 of the base passage 11 interconnecting reservoir 3 with the air trap means.

Figure 4:
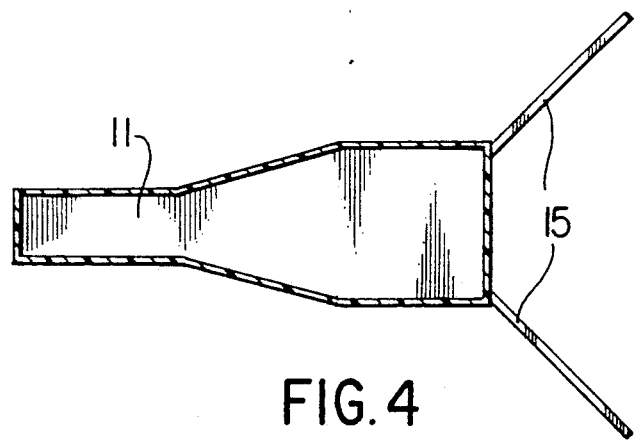
FIG. 4 is a horizontal cross-section of the apparatus of FIG. 1 about line C.

FIG. 4 shows the horizontal cross-section of the base passage 11 interconnecting reservoir 3 with the air trap means, and tabs 15.

With reference to FIG. 1, shelf 10 extends from the right side wall of inlet 4 to a position under chamber 6. The position of the left side of shelf 10 is such that flow from passage 11 rises into chamber 6 at the left side thereof so that an air bubble is thereby pushed down and out from the right side of chamber and into inlet 4.

When the reservoir is partly filled with honey, a measured quantity may be dispensed as follows:

1) reservoir 3 is squeezed until the level of honey in channel 2 reaches the top of channel 2 and begins to enter spout 8.

2) apparatus 1 is tilted from vertical as if to pour the honey from spout 8, placed over the beverage where the honey is desired, and further pressure is applied to the reservoir 3 to begin dispensing the liquid. An air bubble is released from chamber 6 into inlet 4 of channel 2.

3) When the air bubble is emitted at spout 8 (this is easily detectable by the interruption in the flow of honey out of spout 8), pressure is released and apparatus 1 is returned to rest on a level surface. The measured quantity of liquid is thus dispensed. Squeeze reservoir 3 then draws air through spout 8 and channel 2 into reservoir 3 until reservoir 3 regains its natural shape. As air is drawn through inlet 4 and passage 11 into reservoir 3, air chamber 6 is replenished with air and the apparatus 1 is ready for its next dispensation. By this method, a predetermined quantity is dispensed. In the preferred embodiment, this quantity is a volume of honey having the sweetness of one teaspoon of sugar. A little more honey can be dispensed by squeezing a little more after the bubble is emitted from the spout 8. Quantities less than one teaspoon may be dispensed by stopping the squeezing before the bubble reaches the spout 8. For this purpose, graduations 12 are provided on the transparent or translucid channel 2 so that squeezing may be stopped at a calibrated point such as one half teaspoon.

When apparatus 1 is not in use, cap 9 shown in cross-section in FIGS. 1 and 2 is used as closure means to seal out air from channel 2, so that the honey stays fresh.

The bubble is released in the method described above by the action of the honey flow across the base of the chamber 6 as well as by tilting the apparatus 1 to pour the honey from spout 8. Although it is a bit slower, one may cause a bubble to be released from chamber 6 by tilting alone. The chamber, can also be made of a resilient material so that it may also be squeezed to release the bubble. Any one or any combination of the above mentioned three ways can be used to cause the air trap means to release the bubble.

Although the invention has been described as using the example of a reservoir 3 having squeezable sides, it is to be understood that other pressure generating means are possible according to the invention, such as a pump or "accordion" section of the reservoir. The closure means could also include a suitable valve provided either in the spout 8 or channel 2. The air chamber 6 can be located at other positions with respect to inlet 4.

Although only one channel 2 and air trap means are shown in the FIGURES, it is of course possible according to the invention to provide apparatus 1 with two or more channels and air trap means. Two channels and air trap means can be advantageous under certain conditions. The exact dimensions of the height, and cross-sectional area of the channel, and the number of channels and air trap means, are parameters to be determined by one skilled in the art. The factors to be considered are the viscosity of the liquid, surface tension and the maximum desired quantity of liquid to be dispensed. The pressure generating means must be able to expel enough liquid into the measuring channel 2 for measuring, then must expel the desired quantity out the spout 8. Thus in the case of the apparatus 1, reservoir 3 must be capable when squeezed to expel a maximum of a little more than twice the maximum desired quantity to be dispensed. In the preferred embodiment, honey is dispensed for coffee or tea, and so reservoir 3 is preferably able to expel a little more than one teaspoon (ca. 5 mL) meaning that a little more than two teaspoons is suitable (ca. 10 mL). It has been determined for an average liquid honey in the case of a square section channel 2 that the channel section should be dimensioned between 12 mm by 12 mm to 17 mm by 17 mm and preferably 14 mm by 14 mm. If the channel dimensions are too large, it is then more possible that the viscous liquid can flow around the bubble thus making the measurement inaccurate. If the channel dimensions are too small then the viscous resistance becomes great and the required length of the channel to measure a substantial quantity becomes very long.

It is to be understood that the above description of the preferred embodiment is not to be limitative of the scope of the invention as defined in the appended claims.

I claim:

1. An apparatus for dispensing a viscous liquid, the apparatus to be connected with a reservoir for holding the liquid, at least a part of the reservoir being resiliently squeezable, the apparatus comprising:
    a substantially vertical measuring channel having a cross-section suited to allow a bubble of air in the liquid to move along the channel with a flow of the liquid therein, the bubble in the channel for measuring therein a quantity of the liquid to be dispensed;
    a connector for connecting the apparatus with substantially a bottom of the reservoir;
    a spout in communication with an upper part of the air trap means including an air chamber and means for forming a passage, a lower end of the channel being in communication with one side of the chamber, and the passage communicating an opposite side of the chamber with the connector, whereby upon squeezing of the reservoir the flow of the liquid across the chamber from the opposite side to the one side is able in use to release the air bubble from the chamber into said lower end and upon release of pressure on the reservoir to replenish the chamber with air.

2. Apparatus as claimed in claim 1, wherein the flow leaving the passage into the air chamber is directed towards a top of the chamber, such that said flow from the passage to the channel pushes into the chamber and forces the bubble out of the chamber at said one side.

3. Apparatus as claimed in claim 2, wherein said chamber is located forward of said lower end of the channel such that said apparatus may be tilted in a direction of the spout to help release the bubble.

4. Apparatus as claimed in claim 1, further comprising closure means to close fluid communication between an exterior of the apparatus and the channel.

5. Apparatus as claimed in claim 4, wherein said closure means comprise a cap for the spout.

6. Apparatus as claimed in claim 1, moulded from a transparent or translucid plastic material.

7. Apparatus as claimed in claim 1, further comprising graduation lines on the channel, the channel being substantially transparent to make the bubble visible; such that the bubble in conjunction with the graduation lines may be used to indicate a part of the quantity dispensed.

8. Apparatus as claimed in claim 1, wherein in use the viscous liquid is honey, and wherein said cross-section is substantially square shaped and measures between 12 mm by 12 mm and 17 mm by 17 mm.

* * * * *